United States Patent
Schmitz et al.

(10) Patent No.: US 12,552,081 B2
(45) Date of Patent: Feb. 17, 2026

(54) METHOD FOR CALIBRATING ADJUSTING MEANS FOR ADJUSTING A NOZZLE SLOT OF A DISCHARGE NOZZLE FOR A FILM TRACK ON A FLAT FILM MACHINE

(71) Applicant: Windmöller & Hölscher KG, Lengerich (DE)

(72) Inventors: Torsten Schmitz, Lengerich (DE); Waldemar Colell, Lengerich (DE); Bernd-Alexander Groepper, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 355 days.

(21) Appl. No.: 17/287,280

(22) PCT Filed: Nov. 5, 2019

(86) PCT No.: PCT/EP2019/080258
§ 371 (c)(1),
(2) Date: Apr. 21, 2021

(87) PCT Pub. No.: WO2020/094649
PCT Pub. Date: May 14, 2020

(65) Prior Publication Data
US 2022/0111574 A1    Apr. 14, 2022

(30) Foreign Application Priority Data
Nov. 6, 2018    (DE) .................... 10 2018 127 675.3

(51) Int. Cl.
*B29C 48/92*    (2019.01)
*B29C 48/08*    (2019.01)
(Continued)

(52) U.S. Cl.
CPC .............. *B29C 48/92* (2019.02); *B29C 48/08* (2019.02); *B29C 48/313* (2019.02);
(Continued)

(58) Field of Classification Search
CPC ....... B29C 48/92; B29C 48/08; B29C 48/313; B29C 48/2692; B29C 48/10;
(Continued)

(56) References Cited

U.S. PATENT DOCUMENTS

| 4,721,447 A | 1/1988 | Erckmann |
| 5,770,129 A | 6/1998 | Monti |

(Continued)

FOREIGN PATENT DOCUMENTS

| CH | 687047 A5 | 8/1996 |
| CH | 702058 A1 | 4/2011 |

(Continued)

OTHER PUBLICATIONS

Affidavit of Ricky Keller in Support of Third-Party Observations Before the EPO, filed for European Patent Application No. 19725058.5 on Feb. 8, 2021, comprising Exhibit A reproducing Egan Davis-Standard Instruction Manual, Egan Series 50A Coating Die, Internally Deckled, Feb. 1999. (Year: 2021).*

(Continued)

*Primary Examiner* — JaMel M Nelson
(74) *Attorney, Agent, or Firm* — Nicholas D. Cervenka; Peter W. Schroen; Bret E. Field

(57) ABSTRACT

The invention relates to a method for calibrating adjusting means (120) for adjusting a nozzle slot (112) of a discharge nozzle (110) for a film track (FB) on a flat film machine (100), comprising the following steps:
 specifying a calibration position (KP) for the adjusting means (120),
 performing a controlling intervention to change the adjusting position (SP) of the adjusting means (120),
(Continued)

acquiring the reaching of the calibration position (KP) of the adjusting means (120).

14 Claims, 4 Drawing Sheets

(51) Int. Cl.
*B29C 48/31* (2019.01)
*B29L 7/00* (2006.01)
(52) U.S. Cl.
CPC ............... *B29C 2948/92076* (2019.02); *B29C 2948/92409* (2019.02); *B29C 2948/92571* (2019.02); *B29C 2948/92904* (2019.02); *B29L 2007/008* (2013.01)
(58) Field of Classification Search
CPC    B29C 2948/92076; B29C 2948/92409; B29C 2948/92571; B29C 2948/92904; B29C 2948/92628; B29C 2948/92704; B29C 2948/92133; B29C 2948/92152; B29C 2948/92209; B29C 2948/92647; B29C 2948/92942; B29C 48/31; B29L 2007/008
USPC ...................................................... 264/40.7
See application file for complete search history.

(56) References Cited

U.S. PATENT DOCUMENTS

| | | | |
|---|---|---|---|
| 5,951,926 A | 9/1999 | Sensen et al. | |
| 2012/0315378 A1* | 12/2012 | Yapel ..................... | B05D 1/265 118/696 |
| 2013/0334730 A1 | 12/2013 | Maeder et al. | |
| 2014/0377450 A1* | 12/2014 | Knorr ...................... | B05C 5/00 427/9 |
| 2017/0355102 A1* | 12/2017 | Citriniti ............... | G01N 21/952 |

FOREIGN PATENT DOCUMENTS

| | | | | | |
|---|---|---|---|---|---|
| CN | 102216066 | A | | 10/2011 | |
| DE | 3530383 | C2 | | 11/1987 | |
| DE | 4222260 | A1 | | 1/1993 | |
| DE | 19631640 | C1 | | 4/1998 | |
| EP | 1136227 | A2 | | 9/2001 | |
| EP | 2657000 | A1 | | 10/2013 | |
| JP | S63246223 | A | | 10/1988 | |
| JP | H01-257023 | A | | 10/1989 | |
| JP | H07329147 | A | | 12/1995 | |
| JP | H8-85145 | | * | 4/1996 | |
| JP | H0885145 | A | * | 4/1996 | ............. B29C 48/92 |
| JP | 2014-019079 | A | | 2/2014 | |

OTHER PUBLICATIONS

Onaka, JPH8-85145, published Apr. 2, 1996, machine translation to English (Year: 1996).*
Office Action for European Application No. 19170841.1 mailed on Jun. 28, 2023, with its English Translation, 8 pages.
Office Action for German Application No. 102018127675.3 mailed Jul. 3, 2019, with its English translation, 6 pages.
International Preliminary Report on Patentability for PCT Application No. PCT/EP2019/080258 mailed May 11, 2021, 7 pages.
Office Action for Chinese Application No. 201980069921.4 mailed on Oct. 26, 2022, with its English summary, 8 pages.
Office Action for German Application No. 102018127675.3 mailed on Sep. 13, 2022, with English Summary, 7 pages.
Office Action for European Application No. 19798617.7 mailed on Sep. 13, 2023, with its English Translation, 8 pages.
Office Action for China Application No. 201980069921.4 mailed on Nov. 22, 2023, with its English Translation, 9 pages.
Decision of Rejection for Chinese Patent Application No. 201980069921.4 dated Mar. 21, 2024, and its English translation, 17 pages.
Office Action for German Patent Application No. 10 2018 127 675.3, mailed Aug. 5, 2024, and its English translation, 9 pages.
Office Action for corresponding Europe Patent Application No. 19 798 617.7, mailed Jun. 6, 2025, and its English translation, 12 pages.

* cited by examiner

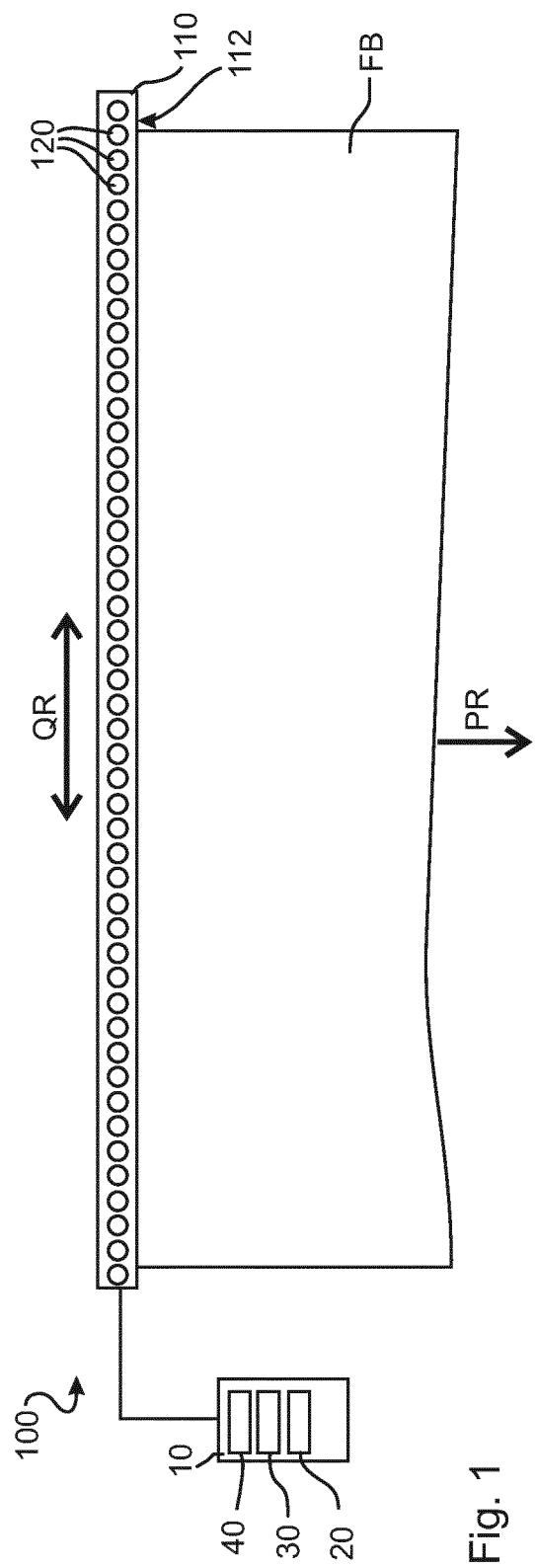
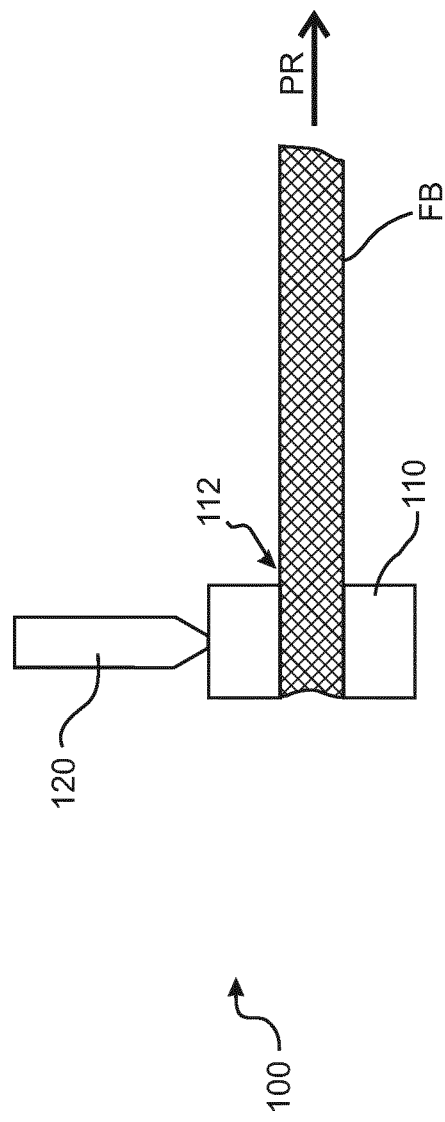

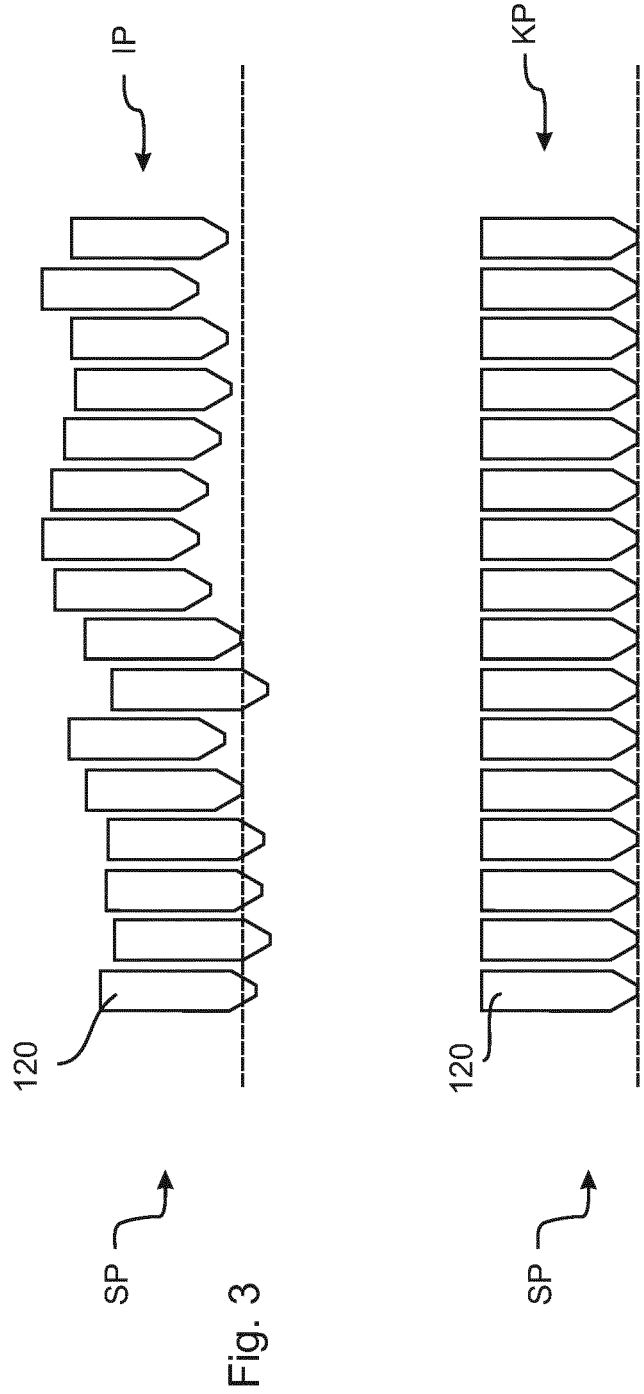

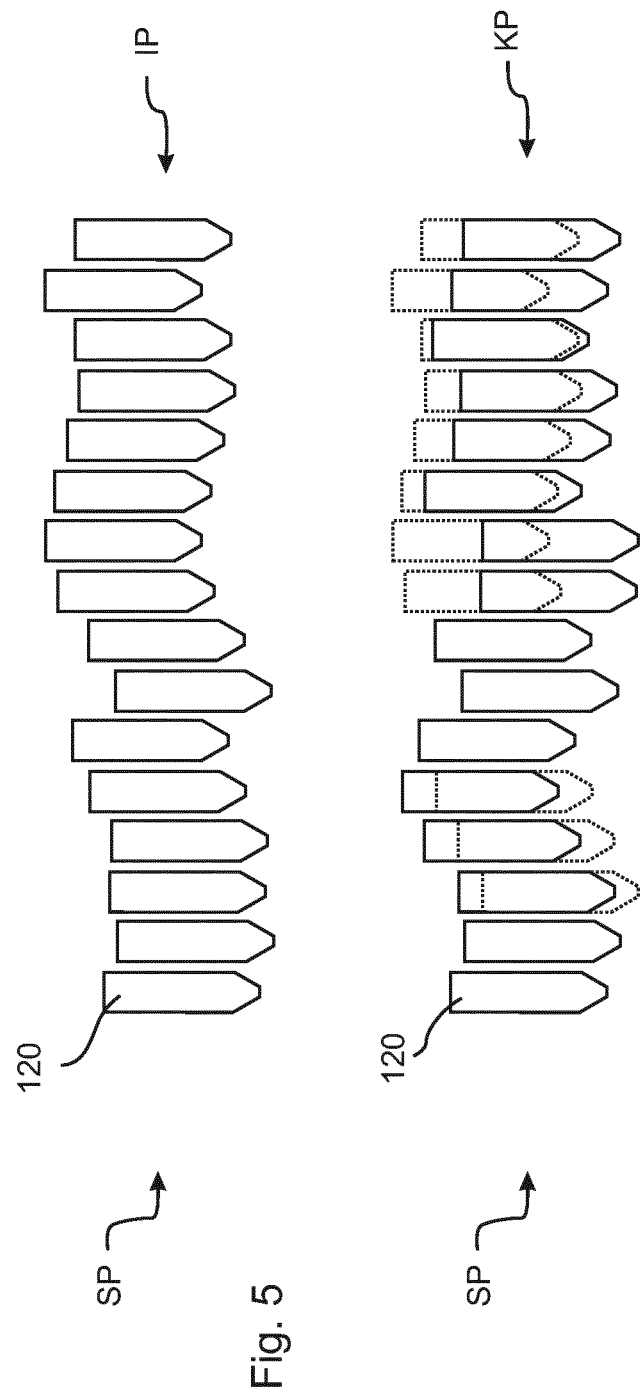

METHOD FOR CALIBRATING ADJUSTING MEANS FOR ADJUSTING A NOZZLE SLOT OF A DISCHARGE NOZZLE FOR A FILM TRACK ON A FLAT FILM MACHINE

INTRODUCTION

The present invention relates to a method for calibrating adjusting means for adjusting a nozzle slot of a discharge nozzle for a film track on a flat film machine and to a controlling device for carrying out such a method.

It is known that flat film machines are used to provide flat film products. For this purpose, such flat film machines comprise a plurality of extrusion devices which are capable of producing a corresponding material composition for different layers of the film product. The melt as material composition is discharged from a nozzle slot of a discharge nozzle of the flat film machine over the entire width. After solidification of the melt, this film product exists as a film track, which is cooled on a cooling roller. Via several subsequent roller systems, the film track can be rolled up in the form of the film product on a winding shaft. In addition, it is also possible to coat or laminate the melt. For example, one or more flat tracks can be added to the melt for this purpose.

To set thickness specifications in the form of a thickness profile, a large number of adjusting means are usually arranged on the discharge nozzle. These can be, for example, so-called thermal bolts which, when subjected to a defined temperature effect, for example as heating power, heating interval, heating voltage or similar, can provide a defined thermal expansion. In this way, it is possible to exert a mechanical influence on the nozzle slot and the discharge nozzle, so that the thickness of the film track at the discharge of the nozzle slot can be changed.

The disadvantage of the known solutions is that the starting point of the regulation of the thickness profile is set manually. For example, the operating personnel of the flat film machine usually adjusts the individual adjusting means by hand at the start of production, in particular when the machine is at a standstill. For this purpose, for example, each adjusting means can be calibrated or adjusted sequentially one after the other using a screw means. The quality of this calibration is based on the experience of the machine operator. This leads to the fact that basically no reproducibility of this calibration is possible. In order to create an exact and defined starting point, the flat film machine must be brought to a complete standstill. Only then can the operating personnel use a mechanical gauge in the nozzle slot to measure the actual extension, i.e. the actual profile of the nozzle slot, or adjust it by varying the adjusting means accordingly. In addition to the lack of reproducibility, the procedure described above leads to a very high expenditure of time. If a complete calibration is necessary, the machine must be shut down, which leads to a very high expenditure of time and loss of production.

SUMMARY

It is an object of the present invention to at least partially eliminate the disadvantages described above. In particular, it is an object of the present invention to implement a reproducibility and, in particular, also a fast feasibility of a calibration on the flat film machine in a cost-effective and simple manner.

The preceding object is solved by a method with the features of the present disclosure and a controlling device with the features of the present disclosure. Further features and details of the invention result from the description and the figures. Features and details which are described in connection with the method according to the invention naturally also apply in connection with the controlling device according to the invention and vice versa in each case, so that with regard to the disclosure concerning the individual aspects of the invention reference is or can always be made mutually According to the invention, the method serves a calibration of adjusting means for adjusting a nozzle slot of a discharge nozzle for a film track on a flat film machine. Such a method comprises the following steps:

specifying a calibration position for the adjusting means,
performing a controlling intervention to change the adjusting position of the adjusting means,
acquiring the reaching of the calibration position of the adjusting means.

In contrast to known solutions, an automated or at least partially automated method can now be provided. This is able to specify a calibration position for one or more adjusting means as a preset value. Subsequently, the adjusting position is changed by a defined controlling intervention. In particular, this second step, i.e. performing the controlling intervention, is carried out in an automated or partially automated manner. In a first step, it is irrelevant whether or not the change in the adjusting position of the adjusting means is acquired during the controlling intervention. It is sufficient for the core idea of the invention if the reaching of the calibration position is monitored. This depends on the way in which the calibration position is specified. If the calibration position is, for example, a defined location specification, the reaching of the calibration position by the adjusting means can be detected with appropriate location sensors. In which way, in which direction and especially how far the adjusting means is still away from the calibration position at the beginning of the method according to the invention is irrelevant in such a procedure. Rather, it is sufficient to set the adjusting means in motion by the controlling intervention so that, correspondingly, at a point in time in the future the calibration position is also reached during this movement. However, it can be advantageous if, in such a simple embodiment of the method according to the invention, the quality, i.e. in particular the direction of the adjustment of the adjusting means is specified. This can be defined, for example, with a basic quality for all adjusting means with a common direction as the quality for this movement by the controlling intervention.

According to the invention, it is now possible to move the adjusting means from any actual position to a calibration position in an automated or partially automated manner. This can be done when the machine is at a standstill as well as during running production. Preferably, as will be explained later, the calibration is carried out in a method step or in a production phase of the flat film machine in which no or only little quality production takes place. For example, during a changing between different formats, but also during a start-up method or during a commissioning phase, these calibration procedures can be carried out.

By means of a method according to the invention, it is thus possible to carry out the calibration in a reproducible manner. It is thus possible, by specifying a calibration position, to repeatedly set all adjusting means to the same or essentially the same starting point, so that a standardized starting point is specified for the subsequent regulation within the production process, for example for the adjustment of thickness profiles within the production process of the flat film machine. In this way, it is possible to run the subsequent controlling methods in the same way as with known solutions, but to be able to count on improved regulation results on the basis of a defined and improved starting point.

There can be advantages if, in a method according to the invention, the same or essentially the same calibration position is specified for at least two adjusting means, in particular for all or essentially all adjusting means. In other words, all adjusting means can be moved into a defined calibration profile, which then forms the starting position for the subsequent regulation steps. A particularly simple solution is to move all adjusting means to an identical or essentially identical zero position. This allows the same or essentially the same stroke path for all adjusting means for the subsequent regulation in normal production of the flat film machine. Simplified controlling with improved controlling results is thus made even easier and possible in an improved manner by a method according to the invention.

It can be further advantageous if, in a method according to the invention, an actual position of the adjusting means is acquired for consideration when performing the controlling intervention. Such an actual position can be provided, for example, by feedback from corresponding sensors. Also, the actual position can provide motion feedback during the method or movement of the adjusting means to ensure controlling during the movement of the adjusting means. In this way, the actual position can provide a qualitative and/or quantitative statement, in particular when a comparison is made between the actual position and the calibration position. Thus, it is possible to provide not only the direction in a qualitative way for the necessary controlling intervention, but even the quantitatively necessary adjusting movement for the respective adjusting means by a defined and determinable distance between the actual position and the calibration position. In particular, an explicit and specific distance between the actual position and the calibration position can be determined for the respective adjusting means. This then also allows a specific adjusting movement to be applied to each adjusting means.

It is also advantageous if, in a method according to the invention, the calibration position is specified in the form of a calibration adjusting force of the adjusting means. In addition to the optical or local sensor acquisition already explained, it is also conceivable that the specification of the calibration position reflects a force ratio. For example, it is possible to determine the force situation between the respective adjusting means and the contacting of the nozzle lip of the discharge nozzle in the form of force monitoring or force sensing. This can be done both in the stationary state of the flat film machine and in the operating state, i.e. when there is force equilibrium with the melt in the nozzle discharge slot. In both cases, it is possible to use the calibration adjusting force as the calibration position or at least as part of the calibration position. This allows a particularly simple acquisition of the calibration position and thus also a particularly simple acquisition of its reach.

Further advantages can be achieved if, in a method according to the invention, specific, in particular different, calibration positions are specified for at least two adjusting means. As has already been explained with reference to the acquisition of the actual position of the adjusting means, in this way a specifically different calibration position for each adjusting means can ensure improved overall calibration. In addition to a specific adjustment of two or more adjusting means, it is also possible to provide different groups of adjusting means with different calibration positions, but the same for the respective group. For example, edge regions of the film track can be distinguished from a net region which is to be wound up as an actual film product after an edge trim. In this way, it is also possible to learn specifically from calibration steps that have already been carried out, so that improved standardization or improved calibration can be made available for future methods.

It is also advantageous if, in a method according to the invention, the controlling intervention is at least partially carried out step by step, in particular in regular steps. A step-by-step adjustment is thus carried out until the specified calibration position is reached. It is also possible to combine this stepwise adjustment with the open adjustment of the controlling intervention explained below. A step-by-step adjustment makes it possible to carry out the regulation simply and cost-effectively, and at the same time to reduce to a minimum the force or speed with which the adjusting means reaches the desired calibration position.

According to a further embodiment of a method according to the invention, it is possible that the controlling intervention takes place at least partially open until the calibration position is reached. This can also be combined with the method described in the preceding paragraph. For example, a movement of the adjusting means towards the calibration position can be made quantitatively in large steps. For the last movement, no more stepwise adjustment is carried out, but rather an open movement occurs slowly until contact is made and, for example, until a defined calibration adjusting force is reached, wherein the calibration position can be reached. The combination of these two variants allows a defined and sensitive calibration position to be set quickly and easily and yet with a high degree of security.

It is also advantageous if, in a method according to the invention, the adjusting means are at least temporarily fixed in the reached calibration position. Such a temporary fixation allows, in particular as reversible fixation, to ensure a defined starting point for the subsequent production method of the film track. Such fixations can be provided with the adjusting means themselves, but also with separate fixing means.

Further advantages can be achieved if, in a method according to the invention, the method steps are carried out during the changing of the flat film machine from a feed product to a follow-on product. This means that the method takes place during ongoing operation of the flat film machine. However, the movement can be provided relatively freely during the changing, so that no consideration of a thickness profile or quality parameters of the produced film track need to be taken during this normalization, since the changing basically involves scrap material.

Also, an object of the present invention is a controlling device for a calibration of adjusting means for adjusting a nozzle slot of a discharge nozzle for a film track on a flat film machine. Such a controlling device comprises a preset module for specifying a calibration position for the adjusting means. Furthermore, an intervention module is provided for carrying out a controlling intervention to change the adjusting position of the adjusting means. In addition, the controlling device is equipped with an acquisition module for acquiring the reaching of the calibration position of the adjusting means. The preset module, the intervention module and/or the acquisition module are preferably designed for performing a method according to the invention.

BRIEF DESCRIPTION OF THE FIGURES

Further advantages, features and details of the invention will be apparent from the following description, in which embodiments of the invention are described in detail with reference to the figures. Thereby, the features mentioned in the claims and in the description may each be essential to the invention individually or in any combination. The figures schematically show:

FIG. 1 an embodiment of a flat film machine with a controlling device according to the invention, FIG. 2 the embodiment of FIG. 1 in schematic side sectional view, FIG. 3 an embodiment of an adjusting profile before calibration, FIG. 4 the embodiment of FIG. 3 after calibration, FIG. 5 an embodiment of an adjusting profile before calibration, FIG. 6 the embodiment of FIG. 5 after calibration, FIG. 7 a possibility of a step-by-step adjustment of the adjusting means, and FIG. 8 a possibility of an open adjustment of the adjusting means.

DETAILED DESCRIPTION OF THE INVENTION

Figure 7:
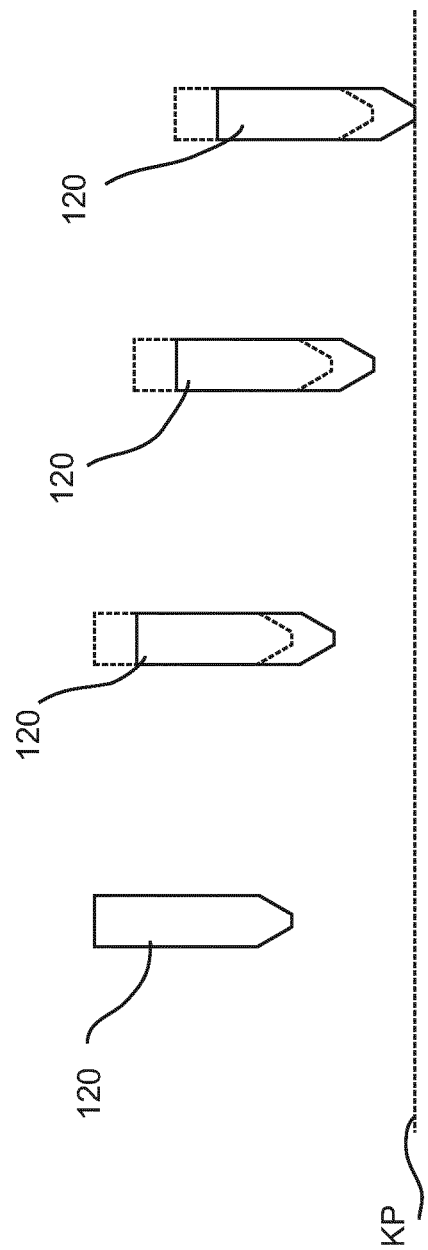

FIGS. 1 and 2 show a flat film machine 100 in which a nozzle slot 112 of a discharge nozzle 110 is provided over the entire transverse direction QR. The film track FB emerges from this nozzle slot 112 along the production direction PR. In order to regulate a thickness profile of this film track FB, a plurality of adjusting means 120 in the form of thermal bolts is provided here.

FIG. 2 shows the action of the thermal bolt as adjusting means 120 from above on the nozzle lip above the nozzle slot 112. By applying thermal energy, a thermal expansion of the adjusting means 120 will reduce the nozzle slot 112, so that the intensity or thickness profile of the film track will be reduced accordingly. FIG. 1 shows the controlling device 10 on the left side of the flat film machine 100, where a preset module can now be used to specify a calibration position KP. Based on this, a corresponding controlling intervention is prepared in an intervention module 30, so that the reaching of this calibration position KP on the flat film machine 100 can be acquired with the aid of the acquisition module 40.

The calibration process can be carried out, for example, according to FIGS. 3 and 4. Thus, the calibration position KP shown here in FIG. 4 is a normalized and equalized alignment of the individual adjusting means 120 with respect to each other. From a starting position in the form of the actual position IP of FIG. 3, the movement can now be carried out in a normalized manner. In this embodiment, the actual position IP and the calibration position KP are shown as adjusting positions SP of the individual adjusting means 120.

FIGS. 5 and 6 also show one possibility of a calibration. Here, too, adjusting positions SP of the adjusting means 120 are used. Again, the starting point is an actual position IP as shown in FIG. 5. However, unlike FIGS. 3 and 4, the calibration position KP for each adjusting means 120 is not a common calibration position KP, but rather specific and different calibration positions KP for each specific adjusting means 120.

FIG. 7 shows how a step-by-step movement, in this case with three individual movements, can be used to perform the overall movement of the adjusting means 120. At the end of the last step at the right end of FIG. 7, the calibration position KP is reached.

Figure 8:
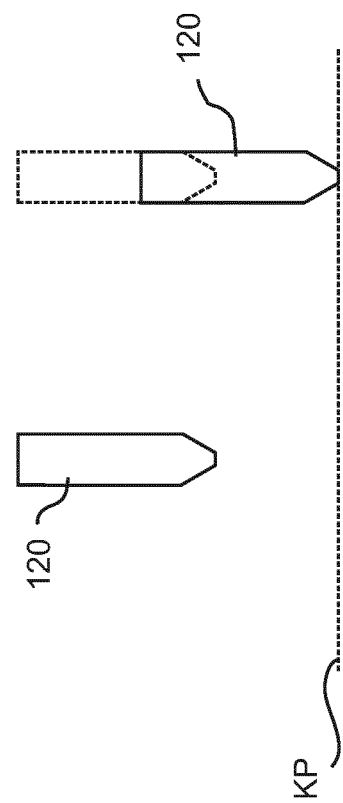

FIG. 8 shows that, independently of the steps according to FIG. 7, a continuous movement of the adjusting means 120 towards the calibration position KP is also possible.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS

10 controlling device
20 preset module
30 intervention module
40 acquisition module
100 flat film machine
110 discharge nozzle
112 nozzle slot
120 adjusting means
FB film track
KP calibration position
IP actual position
SP adjusting position
QR transverse direction
PR production direction

The invention claimed is:

1. A method for calibrating adjusting means for adjusting a nozzle slot of a discharge nozzle for a film track on a flat film machine, comprising the following steps:
    specifying a calibration position for the adjusting means for adjusting the nozzle slot of the discharge nozzle for the film track on the flat film machine,
    performing a controlling intervention to change an adjusting position of the adjusting means, and
    detecting the reaching of the calibration position of the adjusting means during the controlling intervention,
    wherein an actual position of the adjusting means is detected and considered by the controlling intervention,
    wherein an explicit and specific distance between the actual position and the calibration position is determined for the adjusting means,
    wherein the controlling intervention is performed independently of parameters of any produced film track being produced during the controlling intervention, and
    wherein the determined distance is used to apply a specific adjusting movement to the adjusting means during the controlling intervention.

2. The method according to claim 1, wherein the same or essentially the same calibration position is specified for at least two adjusting means.

3. The method according to claim 1, wherein the same or essentially the same calibration position is specified for all or essentially all adjusting means.

4. The method according to claim 1, wherein the calibration position is specified in the form of a calibration adjusting force of the adjusting means.

5. The method according to claim 1, wherein specific calibration positions are specified for at least two adjusting means.

6. The method according to claim 1, wherein different calibration positions are specified for at least two adjusting means.

7. The method according to claim 1, wherein the controlling intervention is at least partially carried out step by step.

8. The method according to claim 1, wherein the controlling intervention is at least partially carried out step by step with regular steps.

9. The method according to claim 1, wherein the controlling intervention takes place at least partially open until the calibration position is reached.

10. The method according to claim 1, wherein the adjusting means are at least temporarily fixed in the reached calibration position.

11. The method according to claim 1, wherein the method steps are carried out during the changing of the flat film machine from a feed product to a follow-on product.

12. A controlling device for a calibration of adjusting means for adjusting a nozzle slot of a discharge nozzle for a film track on a flat film machine, comprising a preset module for specifying a calibration position for the adjusting means, an intervention module for carrying out a controlling intervention to change an adjusting position of the adjusting means, further comprising an acquisition module for acquiring the reaching of the calibration position of the adjusting means, wherein at least the preset module, the intervention module or the acquisition module are designed for carrying out a method for calibrating the adjusting means for adjusting the nozzle slot of the discharge nozzle for the film track on the flat film machine, comprising the following steps:

specifying a calibration position for the adjusting means for adjusting the nozzle slot of the discharge nozzle for the film track on the flat film machine, performing a controlling intervention to change the adjusting position of the adjusting means, and detecting the reaching of the calibration position of the adjusting means during the controlling intervention, wherein an actual position of the adjusting means is detected and considered by the controlling intervention, wherein an explicit and specific distance between the actual position and the calibration position is determined for the adjusting means, wherein the controlling intervention is performed independently of parameters of any produced film track being produced during the controlling intervention, and wherein the determined distance is used to apply a specific adjusting movement to the adjusting means during the controlling intervention.

13. The method according to claim 1, wherein the calibration is performed in a phase in which no quality production takes place.

14. The controlling device according to claim 12, wherein the calibration is performed in a phase in which no quality production takes place.

* * * * *